M. J. HAGERTY.
AUTOMATIC SAFETY APPLIANCE FOR MOTOR VEHICLES.
APPLICATION FILED SEPT. 17, 1920.
1,391,952.
Patented Sept. 27, 1921.
2 SHEETS—SHEET 2.
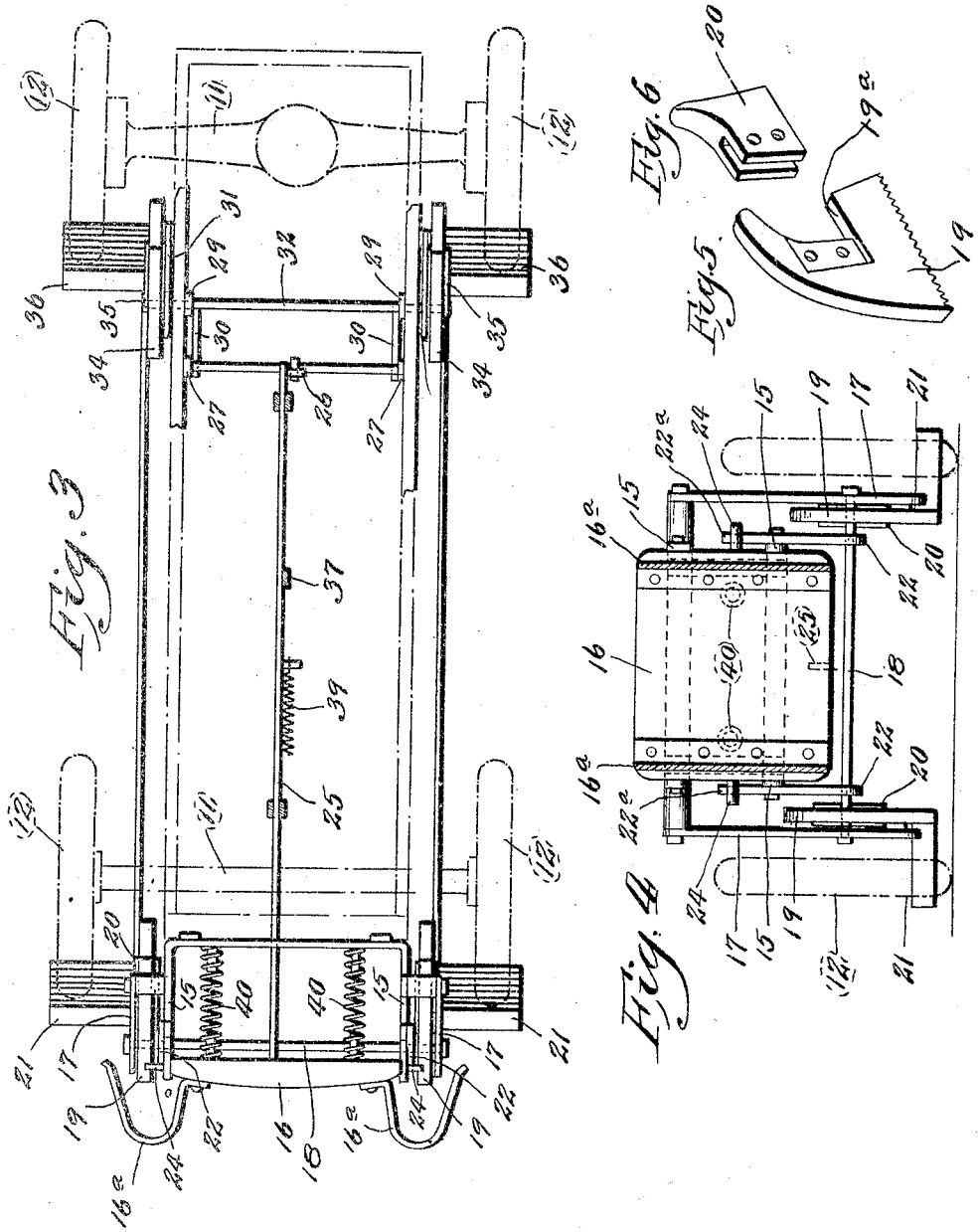
Inventor
Michael Joseph Hagerty
By F. R. Cornwall Atty.

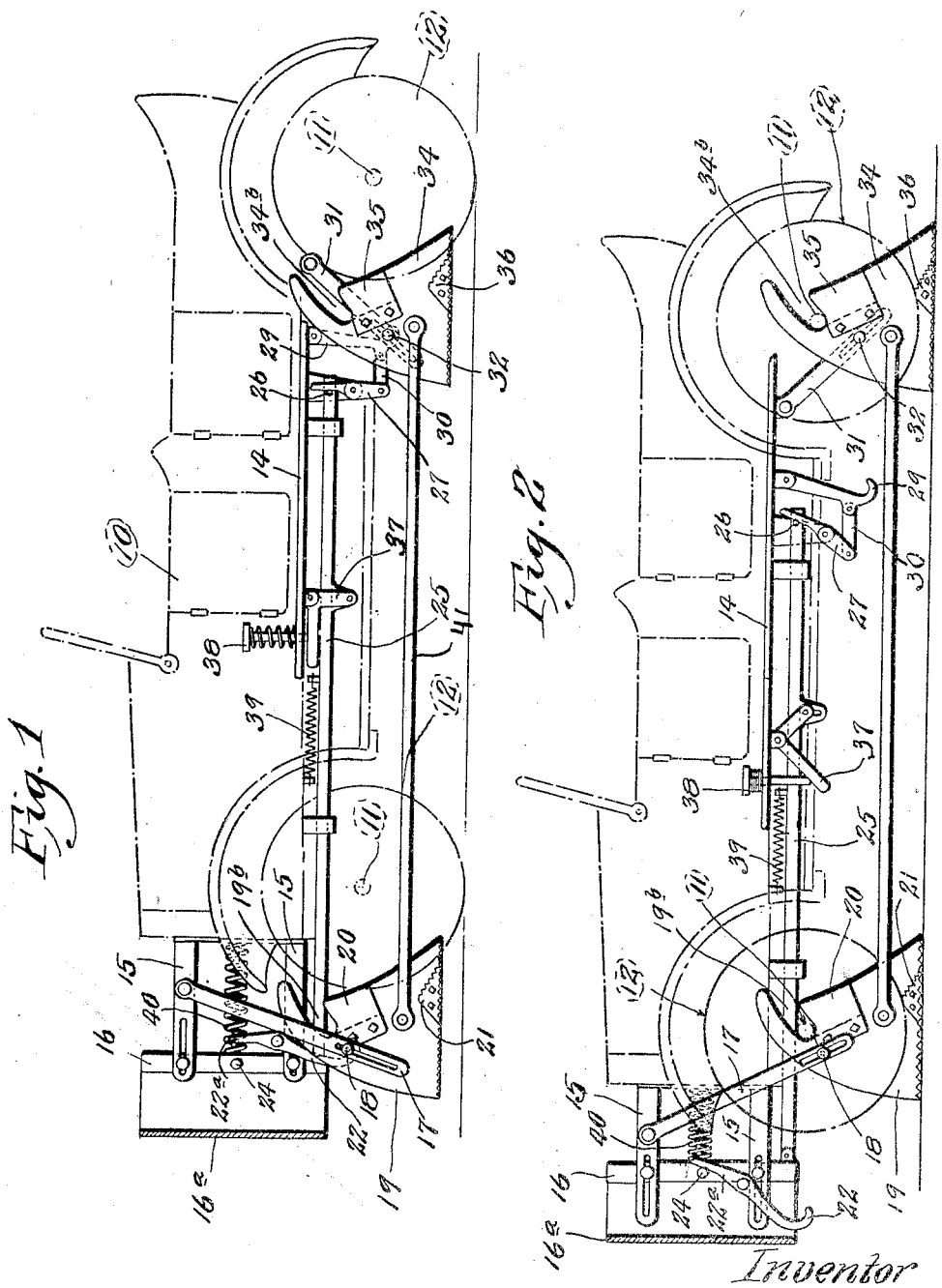

UNITED STATES PATENT OFFICE.

MICHAEL JOSEPH HAGERTY, OF ST. LOUIS, MISSOURI.

AUTOMATIC SAFETY APPLIANCE FOR MOTOR-VEHICLES.

1,391,952.  Specification of Letters Patent.  Patented Sept. 27, 1921.

Application filed September 17, 1920. Serial No. 410,835.

*To all whom it may concern:*

Be it known that I, MICHAEL J. HAGERTY, a citizen of the United States, residing at St. Louis, Missouri, have invented a certain new and useful Improvement in Automatic Safety Appliances for Motor-Vehicles, of which the following is a full, clear, and exact description, such as will enable others skilled in the art to which it appertains to make and use the same, reference being had to the accompanying drawings, forming part of this specification.

This invention relates generally to safety appliances for vehicles and more particularly to an appliance which will stop a moving vehicle either automatically or at the will of the driver.

The principal objects of my invention are, to provide a device which can be easily applied to vehicles and which device will stop the vehicle when in motion and in danger of collision; to provide a device which will either automatically or at the will of the driver stop a moving vehicle and thereby prevent collision and consequent injury to the occupants of the vehicle or of the vehicle itself; to provide a device which when the vehicle collides with a person or an object acts as a shock absorber, cushioning the impact produced by the collision and automatically stopping the motion of the vehicle, thereby preventing injury to the person and damage to the vehicle.

Another object of my invention is to provide a device, having the above-mentioned objects in view, and which device can be utilized as a stand to support the vehicle in a raised position, so that the weight of said vehicle is transmitted from the wheels to said device.

In order to accomplish these objects, I provide a device which can be attached to a vehicle such as an automobile, and which device when set in operation either automatically or by the driver will cause the automobile to be elevated from the ground and the axle of the vehicle will be supported by suitable blocks so that the wheels of the vehicle will be raised from the ground and spin idly in the air.

With the foregoing and other objects in view, my invention resides in certain novel features of construction and form, hereinafter more fully described and claimed, and illustrated in the accompanying drawings, in which—

Figure 1 is a side elevation of an automobile equipped with my device and showing said device in normal position.

Fig. 2 is a side elevation, showing the device in its actuated position whereby the automobile is raised and stationarily supported by said device.

Fig. 3 is a plan view of the device and showing the automobile, in dotted lines.

Fig. 4 is a front end view of said device.

Fig. 5 is a detail view of the supporting block.

Fig. 6 is a detail view of a pad designed to be attached to the supporting block to form an axle receiving notch.

In the drawings, 10 designates the body of the automobile, shown in dotted lines, and having wheels 12, axles 11, and floor 14. The forward end of the automobile is provided with forwardly projecting horizontally disposed arms 15 fixed to said automobile in any suitable manner. The forward ends of arms 15 are provided with horizontal slots and in which are located pins or projections formed on the sides of a bumper or striking plate 16.

Projecting forwardly and outwardly from the sides of the striking plate are wings 16$^a$. Pivotally connected to the arms 15 are the upper ends of arms 17, the lower ends of which are slotted and passing through the slots transversely of the automobile is a rod 18. Blocks 19 are disposed forwardly and to the inner side of the front wheels of the vehicle and are carried by rod 18. The upper ends of blocks 19 are curved upwardly and rearwardly toward the front axle and are provided with seats 19$^a$ which are adapted to receive detachable pads 20. When pads 20 are in position on the blocks 19, the upper ends of said pads coöperate with the upper ends of blocks 19 to form axle receiving notches 19$^b$.

Detachably fixed to blocks 19 and projecting outwardly therefrom are transverse lugs 21. These lugs are triangular in shape and are provided on their rear faces with serrations. Pivotally connected to the lower set of arms 15 are hooks 22 which extend downwardly under rod 18 and are adapted to hold blocks 19 in their normal or elevated position. Hooks 22 are provided with upward extensions 22ª and projecting outwardly from the sides of the striking plate 16 are pins 24 which when the striking plate 16 is moved rearwardly strike the upward projections 22ª, causing hooks 22 to move outwardly away from rod 18, thereby permitting rod 18 to move downwardly in the slots in the lower ends of arms 17 so that blocks 19 will drop to the ground.

A link 25, whose forward end is connected to bumper 16, extends rearwardly under the vehicle 10 and is supported in suitable brackets carried by the floor of the vehicle. The rear end of link 25 is provided with a pin 26 which lies in front of the pivotal arm 27 pivotally supported from the floor of the vehicle. Pivotally supported from the floor of the vehicle are hooks 29 which are connected to arms 27 by means of short links 30. Arms 31 are pivotally supported from the floor of the vehicle and to the rear of hooks 29. The lower ends of arms 31 are slotted and passing through these slots is a transverse rod 32. Carried by rod 32 and located forwardly to one side of each rear wheel are blocks 34 which are similar in construction to blocks 19 having curved upper ends and being provided with pads 35 to form notches 34ᵇ.

Projecting outwardly from blocks 34 and in the path of the rear wheels of the vehicle are lugs 36. A bell crank 37 is pivotally supported in said automobile and is adapted to be actuated by a spring-pressed pedal 38 located in the driver's compartment. The lower end of the bell crank has a pin and slot connection with link 25 so that when pedal 38 is operated, link 25 will be moved rearwardly to operate arms 27 and hooks 29. A spring 39, one end of which is fixed to link 25 and the other to the body of the automobile, tends to maintain link 25 in its normal position. Expansive springs 40, the forward ends of which bear against the striking plate 16, tend to maintain striking plate 16 in its normal or outward position.

Normally blocks 19 and 34 are suspended above the ground as shown in Figs. 1 and 3, and locked in position by means of hooks 22 and 29 engaging rods 18 and 32, the ends of which are fixed in blocks 19 and 34, respectively, and occupy the upper ends of slots formed in the arms 17 and 31. Bumper 16 and wings 16ª are held in the forward position by means of expansive springs 40. Link 25, the forward end of which is connected to bumper 16, is maintained in its normal position by means of its connection with the bumper and by contracting spring 39.

As long as the road traveled by the vehicle is clear of any obstruction, the blocks will maintain their normal position and will not be actuated. When the vehicle strikes an obstruction, i. e., another vehicle, wall or person, bumper 16 will yield, moving rearwardly and compressing springs 40. This rearward movement of the bumper forces pins 24 carried by said bumper against the upper ends 22ª of hooks 22 which are pivoted to arms 15 and moves said hooks away from rod 18, thereby permitting blocks 19 to drop to the ground as shown in Fig. 2. Blocks 19 are guided in their movement by arms 17 pivotally supported on arms 15 and provided with slots in their lower ends in which slots operate the ends of rod 18. The rearward movement of bumper 16 moves link 25 rearwardly and forces pin 26 carried by the rear end of said link against the upward extension of pivoted arms 27, causing said arms to swing forwardly. Hooks 29, being connected to arms 27 by links 30, will swing forwardly with arms 27 and away from rod 32 so that rear blocks 34 being no longer supported by hooks 29 will drop to the ground simultaneously with the front blocks 19.

Arms 31 pivotally supported on the vehicle guide blocks 34 in their movement, the ends of rods 32 which are carried by blocks 34 being mounted in the lower slotted ends of arms 31. As soon as blocks 19 and 34 drop to the ground, they remain stationary while the vehicle moves forward so that the front wheels of the vehicle ride on the inclined faces of laterally projecting lugs 21 carried by the front blocks 19 and the rear wheels ride upon the inclined faces of laterally projecting lugs 36 carried by rear blocks 34.

When the wheels of the vehicle reach the highest point or peak of lugs 21 and 36, the front axle has passed the high points of pads 20 and entered the downwardly inclined notches 19ª in blocks 19 and the rear axle at the same time has passed the high points of pads 35 and entered the downwardly inclined notches 34ᵇ in blocks 34. As the wheels of the vehicle pass the peaks of lugs 21 and 36, the axles of the vehicle will drop into the notches 19ᵇ and 34ᵇ and as the distance from the notches to the ground line of blocks 19 and 34 is greater than the distance from the periphery of the wheels to the axles, the vehicle will be held elevated from the ground so that the wheels will be out of contact with the ground and will spin in the air and consequently the vehicle will remain stationary.

To release the vehicle from the blocks 19 and 34, pads 20 and 35 are detached from blocks 19 and 34 so that the wheels of the vehicle will roll down the rear inclined faces of lugs 21 and 36. By pivotally connecting the upper ends of arms 17 and 31 and by providing their lower ends with slots in which the ends of rods 18 and 32 are supported, the vehicle can move forwardly while blocks 19 and 34 are stationary, a sufficient distance to permit the wheels of the vehicle to ride up the inclined faces of lugs 21 and 36.

If desired, blocks 19 and 34 can be operated by the driver by pressing pedal or button 38 which operates bell crank 37 and moves link 25 and bumper 16 rearwardly and actuates hooks 22 and 29 to release blocks 19 and 34.

Each front block 19 is connected to its respective rear block 34 by means of tie rods 41 which assist to maintain said blocks in their operative positions. By means of my device, a vehicle can be supported in a raised position in a garage or when parking or for demonstrating or display purposes.

While I have shown the device as applied to an automobile, it will be readily understood that the device with minor changes in the size, form and construction of the various parts, can be applied to various vehicles, without departing from the spirit of my invention, the scope of which is set forth in the appended claims.

I claim as my invention:

1. The combination with a vehicle, of supporting members mounted thereon in a normally inoperative position and adapted to be moved into a supporting position on the ground, said supporting members being provided with seats for receiving the axles of said vehicle, laterally projecting lugs fixed on said members and designed to be engaged by the wheels of the vehicle when said supporting members are positioned on the ground whereby the vehicle is raised out of contact with the ground and the axles are seated in the axle seats of said members.

2. The combination with a vehicle, of means pivotally supported thereon, supporting members slidably mounted in said means and provided with seats for receiving the axles of said vehicle, blocks projecting laterally from said supporting means and having their rear walls inclined forwardly and upwardly, and releasable means for normally holding said supporting members in inoperative position, said supporting members being adapted when released to be moved into positions on the ground whereby the wheels of the vehicle will ride upon the inclined rear wall of said blocks and the axles of the vehicle will be engaged by the axle seats of the supporting members.

3. The combination with a vehicle, of means pivotally supported thereon, supporting members slidably mounted in said means and provided with seats for receiving the axles of said vehicle, blocks projecting laterally from said supporting means and having their rear walls inclined forwardly and upwardly, releasable means for normally holding said supporting members in inoperative position, said supporting members being adapted when released to be moved into positions on the ground whereby the wheels of the vehicle will ride upon the inclined rear wall of said blocks and the axles of the vehicle will be engaged by the axle seats of the supporting members, and means operable by the driver for operating said releasable means to release said supporting members.

4. The combination with a vehicle, of arms pivotally mounted thereon, standards slidably carried by said arms and provided at their upper ends with axle seats, a lug carried by each standard and projecting laterally therefrom in front of each wheel, and releasable means for normally maintaining said standards in a raised position, said standards being adapted when released to drop to the ground whereby the lugs are positioned in the path of movement of the wheels of the vehicle so that the latter is raised thereby and its axles occupy the axle seats in said standards.

5. The combination with a vehicle, of blocks movably supported forwardly and to one side of each wheel and having lateral lugs projecting outwardly in the path of each wheel, the upper ends of said blocks being notched to receive the axles of said vehicle, and means for normally holding said blocks in elevated position and adapted to release said blocks whereby they will rest on the ground and the wheels of said vehicle will ride upon the inclined portion of said lugs until the axles occupy the notches in said lugs whereby said vehicle will be held in stationary position.

6. The combination with a vehicle, of blocks movably supported on said vehicle, removable pads carried by said blocks to form notches in the upper end of said blocks and adapted to receive the axles of said vehicle, said blocks being arranged to be released and rest on the ground whereby the wheels of said vehicle will ride upon the inclined portion carried by said blocks and the axles drop into the notches formed in the upper ends of said blocks so that the automobile will be maintained in elevated position, said pads being detachable in order to release the vehicle from its elevated position.

7. The combination with a vehicle, of a device having standards normally held in inoperative position and adapted to be actuated to drop to the ground and said standards being provided with seats adapted to receive the axles of said vehicle, wedge-shaped blocks carried by said standards and adapted to engage the wheels of said vehicle, whereby said axles will occupy said seats, and said vehicle will be supported in a raised position by said standards.

In testimony whereof I hereunto affix my signature this 9th day of September, 1920.

MICHAEL JOSEPH HAGERTY.